(12) United States Patent
Go et al.

(10) Patent No.: US 12,047,315 B2
(45) Date of Patent: Jul. 23, 2024

(54) SOUNDING REFERENCE SIGNAL IN WIRELESS COMMUNICATION SYSTEM

(71) Applicant: LG ELECTRONICS INC., Seoul (KR)

(72) Inventors: Seongwon Go, Seoul (KR); Jonghyun Park, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

(21) Appl. No.: 17/593,878

(22) PCT Filed: Mar. 27, 2020

(86) PCT No.: PCT/KR2020/004250
§ 371 (c)(1),
(2) Date: Sep. 27, 2021

(87) PCT Pub. No.: WO2020/197335
PCT Pub. Date: Oct. 1, 2020

(65) Prior Publication Data
US 2022/0173858 A1    Jun. 2, 2022

Related U.S. Application Data

(60) Provisional application No. 62/825,772, filed on Mar. 28, 2019.

(51) Int. Cl.
*H04L 5/00* (2006.01)
*H04L 1/08* (2006.01)
(52) U.S. Cl.
CPC .............. *H04L 5/0048* (2013.01); *H04L 1/08* (2013.01)

(58) Field of Classification Search
None
See application file for complete search history.

(56) References Cited

U.S. PATENT DOCUMENTS

2013/0242911 A1* 9/2013 Heo .................... H04W 52/367
370/329
2017/0251497 A1* 8/2017 Larsson ................ H04W 16/14

FOREIGN PATENT DOCUMENTS

WO    2018172249    9/2018

OTHER PUBLICATIONS

PCT International Application No. PCT/KR2020/004250, International Search Report dated Jul. 17, 2020, 5 pages.
Huawei, "Introduction of additional SRS symbols in normal UL subframe," R1-1901585, 3GPP TSG RAN WG1 Meeting #96, Mar. 2019, 5 pages.
ZTE, "Discussion on additional SRS symbols," R1-1901644, 3GPP TSG RAN WG1 Meeting #96, Mar. 2019, 4 pages.
Qualcomm Incorporated, "Additional SRS symbols," R1-1902380, 3GPP TSG-RAN WG1 #96, Mar. 2019, 6 pages.
Ericsson, "On Rel-16 LTE SRS enhancements," R1-1902914, 3GPP TSG RAN WG1 Meeting #96, Mar. 2019, 5 pages.

* cited by examiner

*Primary Examiner* — Diane L Lo
(74) *Attorney, Agent, or Firm* — LEE, HONG, DEGERMAN, KANG & WAIMEY

(57) ABSTRACT

A method by which a terminal transmits a sounding reference signal (SRS) in a wireless communication system according to an embodiment of the present application comprises the steps of: receiving setting information related to transmission of the sounding reference signal (SRS); and transmitting the SRS.

9 Claims, 23 Drawing Sheets

[FIG. 1]
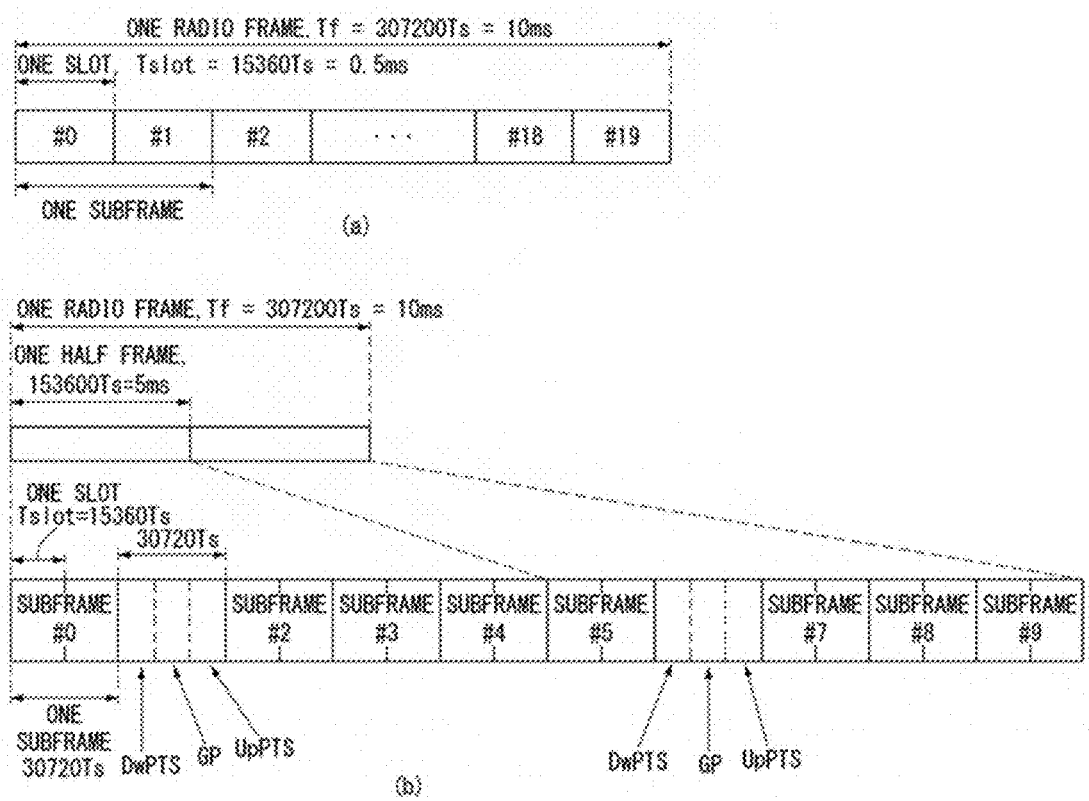

[FIG. 2]
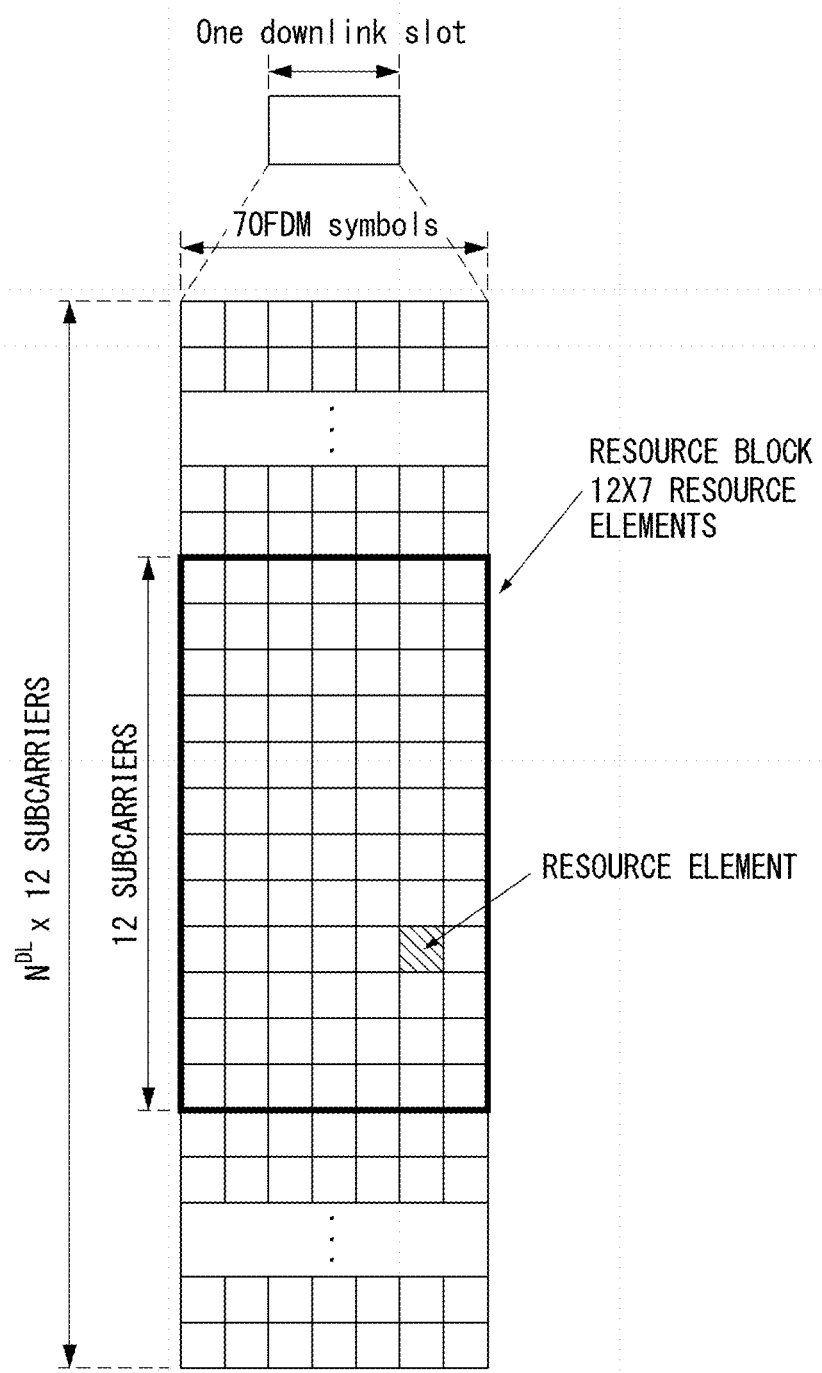

[FIG. 3]
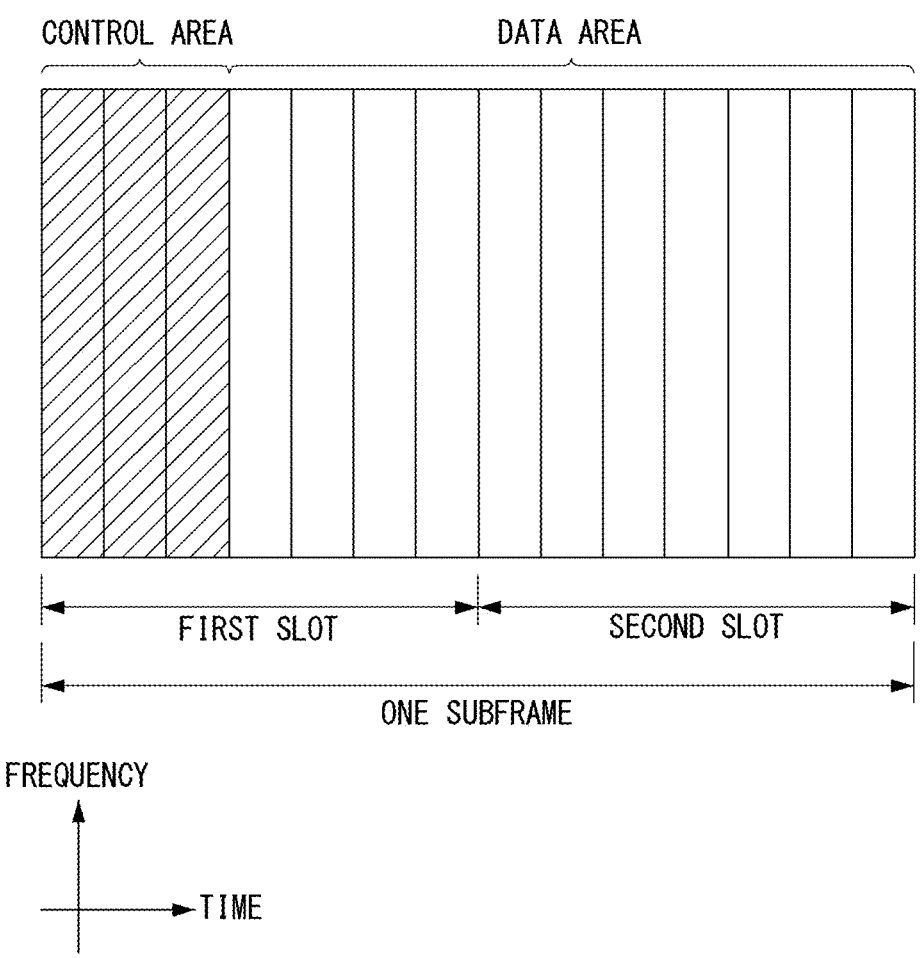

[FIG. 4]
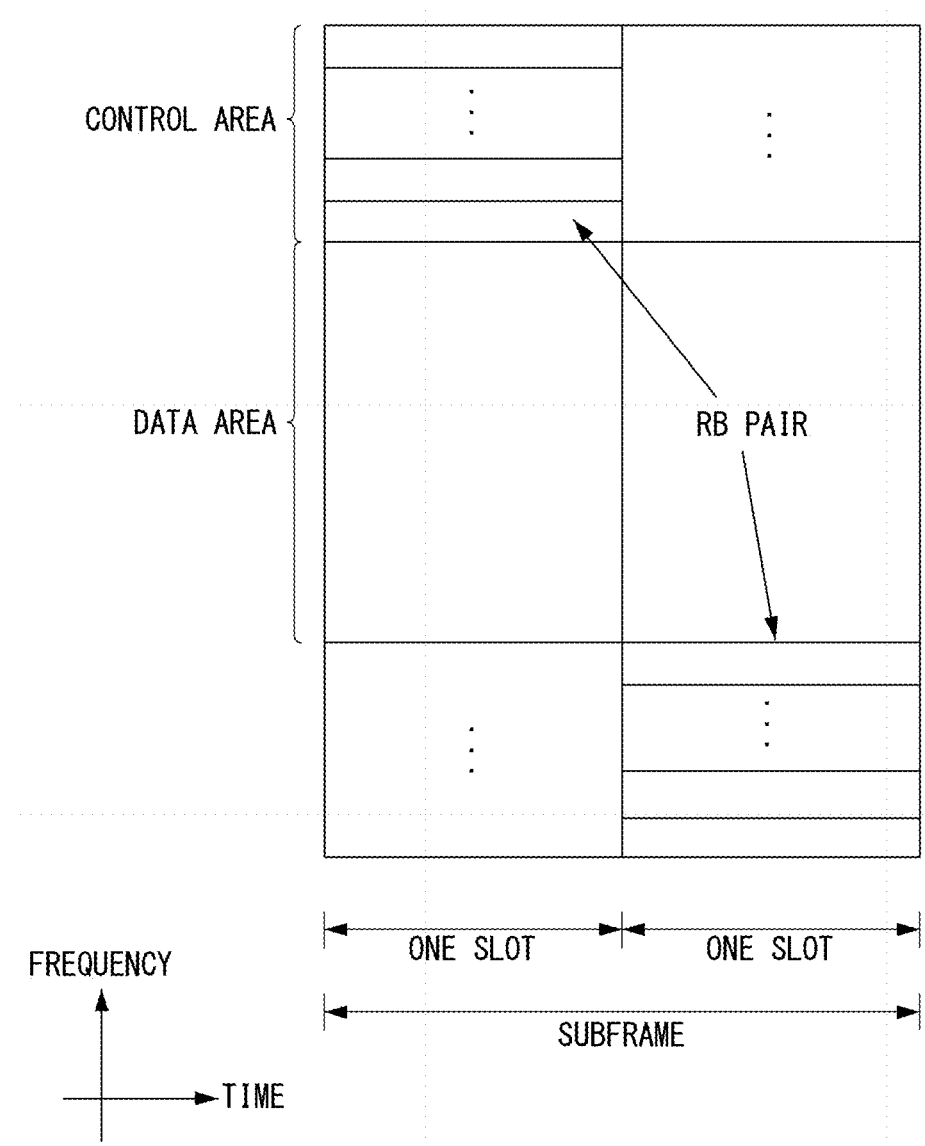

[FIG. 5]
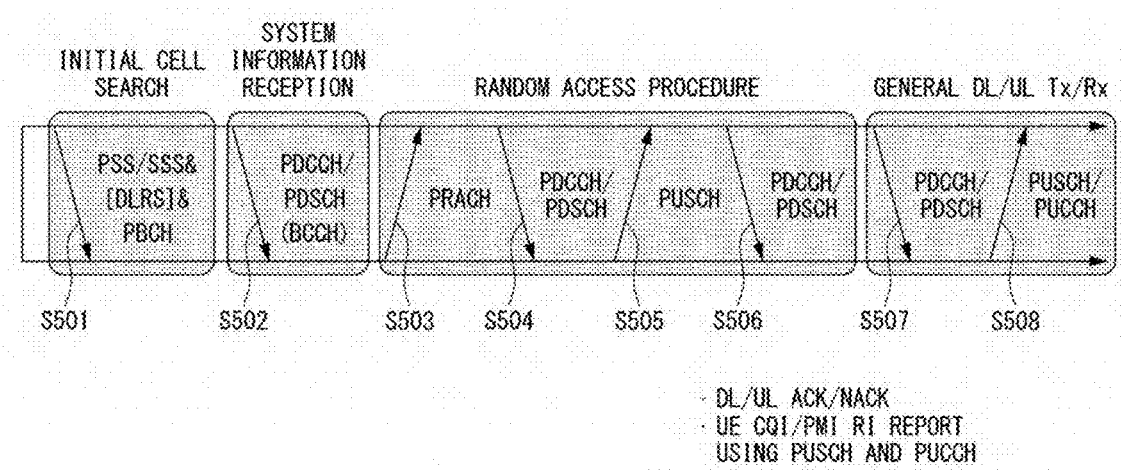

[FIG. 6]
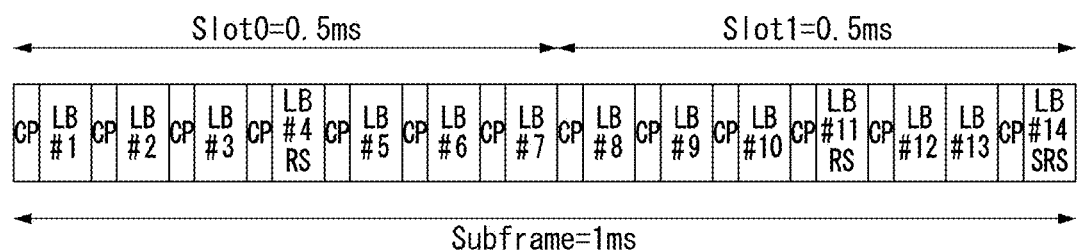

[FIG. 7]
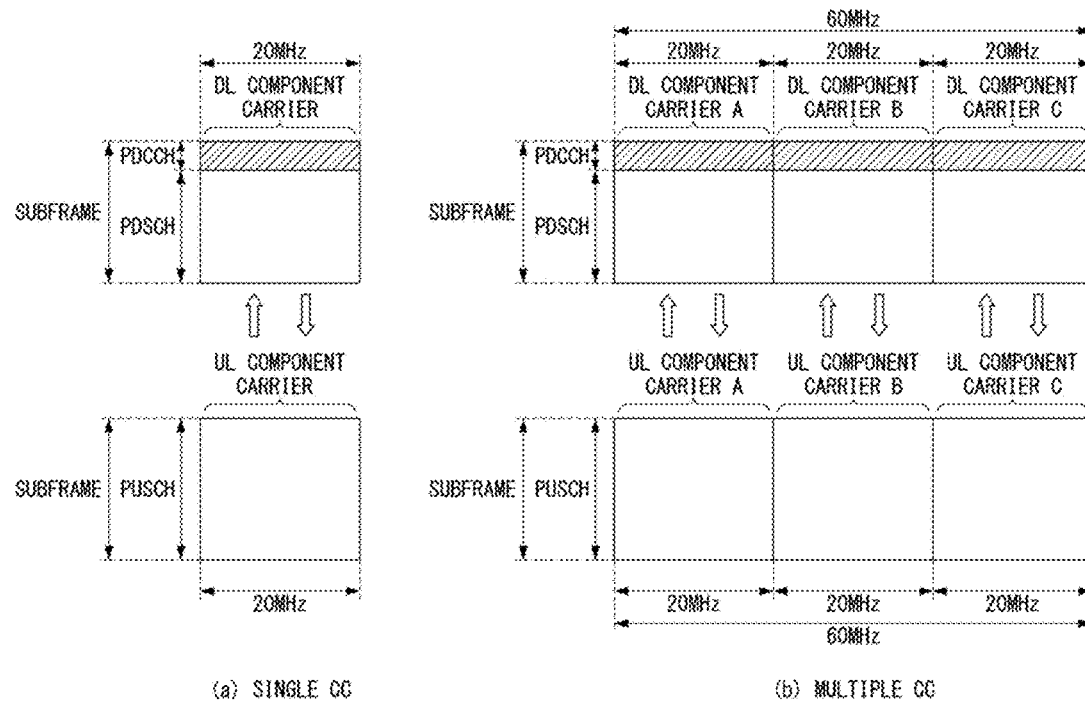
(a) SINGLE CC
(b) MULTIPLE CC

[FIG. 8]
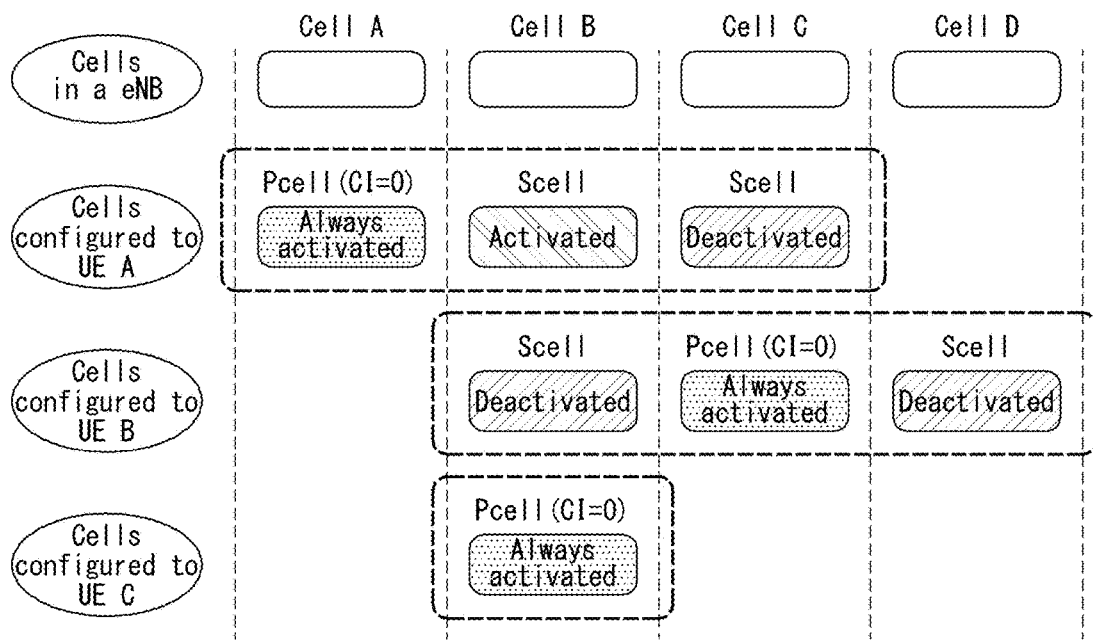

[FIG. 9]

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| RB0 | ▨ | ▨ | ▨ | ▨ |  |  |  |  |  |  |  |  |  | ■ |
| RB1 | ▨ | ▨ | ▨ | ▨ |  |  |  |  |  |  |  |  |  | ■ |
| RB2 | ▨ | ▨ | ▨ | ▨ |  |  |  |  |  |  |  |  |  | ■ |
| RB3 | ▨ | ▨ | ▨ | ▨ |  |  |  |  |  |  |  |  |  | ■ |
| RB4 |  |  |  |  |  |  |  |  | ▨ | ▨ | ▨ |  |  | ■ |
| RB5 |  |  |  |  |  |  |  |  | ▨ | ▨ | ▨ |  |  | ■ |
| RB6 |  |  |  |  |  |  |  |  | ▨ | ▨ | ▨ |  |  | ■ |
| RB7 |  |  |  |  |  |  |  |  | ▨ | ▨ | ▨ |  |  | ■ |
| RB8 |  |  |  |  | ▨ | ▨ | ▨ | ▨ |  |  |  |  |  | ■ |
| RB9 |  |  |  |  | ▨ | ▨ | ▨ | ▨ |  |  |  |  |  | ■ |
| RB10 |  |  |  |  | ▨ | ▨ | ▨ | ▨ |  |  |  |  |  | ■ |
| RB11 |  |  |  |  | ▨ | ▨ | ▨ | ▨ |  |  |  |  |  | ■ |

[FIG. 10]

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| RB0 | ▨ | ▨ | ▨ | ▨ |  |  |  |  |  |  |  |  |  | ■ |
| RB1 | ▨ | ▨ | ▨ | ▨ |  |  |  |  |  |  |  |  |  | ■ |
| RB2 | ▨ | ▨ | ▨ | ▨ |  |  |  |  |  |  |  |  |  | ■ |
| RB3 | ▨ | ▨ | ▨ | ▨ |  |  |  |  |  |  |  |  |  | ■ |
| RB4 |  |  |  |  |  |  |  |  |  |  |  |  |  | ■ |
| RB5 |  |  |  |  |  |  |  |  |  |  |  |  |  | ■ |
| RB6 |  |  |  |  |  |  |  |  |  |  |  |  |  | ■ |
| RB7 |  |  |  |  |  |  |  |  |  |  |  |  |  | ■ |
| RB8 |  |  |  |  | ▨ | ▨ | ▨ | ▨ | ▨ | ▨ | ▨ |  |  | ■ |
| RB9 |  |  |  |  | ▨ | ▨ | ▨ | ▨ | ▨ | ▨ | ▨ |  |  | ■ |
| RB10 |  |  |  |  | ▨ | ▨ | ▨ | ▨ | ▨ | ▨ | ▨ |  |  | ■ |
| RB11 |  |  |  |  | ▨ | ▨ | ▨ | ▨ | ▨ | ▨ | ▨ |  |  | ■ |

[FIG. 11]

|      | 0 | 1 | 2 | 3 | 4 | 5 | 6 | 7 | 8 | 9 | 10 | 11 | 12 | 13 |
|------|---|---|---|---|---|---|---|---|---|---|----|----|----|----|
| RB0  | ▨ | ▨ | ▨ | ▨ |   |   |   |   |   |   |    |    |    | ■ |
| RB1  | ▨ | ▨ | ▨ | ▨ |   |   |   |   |   |   |    |    |    | ■ |
| RB2  | ▨ | ▨ | ▨ | ▨ |   |   |   |   |   |   |    |    |    | ■ |
| RB3  | ▨ | ▨ | ▨ | ▨ |   |   |   |   |   |   |    |    |    | ■ |
| RB4  |   |   |   |   |   |   |   |   |   |   |    |    |    | ■ |
| RB5  |   |   |   |   |   |   |   |   |   |   |    |    |    | ■ |
| RB6  |   |   |   |   |   |   |   |   |   |   |    |    |    | ■ |
| RB7  |   |   |   |   |   |   |   |   |   |   |    |    |    | ■ |
| RB8  |   |   |   |   | ▨ | ▨ | ▨ | ▨ |   |   |    |    |    | ■ |
| RB9  |   |   |   |   | ▨ | ▨ | ▨ | ▨ |   |   |    |    |    | ■ |
| RB10 |   |   |   |   | ▨ | ▨ | ▨ | ▨ |   |   |    |    |    | ■ |
| RB11 |   |   |   |   | ▨ | ▨ | ▨ | ▨ |   |   |    |    |    | ■ |

[FIG. 12]

|      | 0 | 1 | 2 | 3 | 4 | 5 | 6 | 7 | 8 | 9 | 10 | 11 | 12 | 13 |
|------|---|---|---|---|---|---|---|---|---|---|----|----|----|----|
| RB0  | ▨ | ▨ | ▨ | ▨ |   |   |   |   |   |   |    |    |    | ■ |
| RB1  | ▨ | ▨ | ▨ | ▨ |   |   |   |   |   |   |    |    |    | ■ |
| RB2  | ▨ | ▨ | ▨ | ▨ |   |   |   |   |   |   |    |    |    | ■ |
| RB3  | ▨ | ▨ | ▨ | ▨ |   |   |   |   |   |   |    |    |    | ■ |
| RB4  |   |   |   |   |   |   |   |   | ▨ | ▨ | ▨  |    |    | ■ |
| RB5  |   |   |   |   |   |   |   |   | ▨ | ▨ | ▨  |    |    | ■ |
| RB6  |   |   |   |   |   |   |   |   | ▨ | ▨ | ▨  |    |    | ■ |
| RB7  |   |   |   |   |   |   |   |   | ▨ | ▨ | ▨  |    |    | ■ |
| RB8  |   |   |   |   | ▨ | ▨ | ▨ | ▨ |   |   |    |    |    | ■ |
| RB9  |   |   |   |   | ▨ | ▨ | ▨ | ▨ |   |   |    |    |    | ■ |
| RB10 |   |   |   |   | ▨ | ▨ | ▨ | ▨ |   |   |    |    |    | ■ |
| RB11 |   |   |   |   | ▨ | ▨ | ▨ | ▨ |   |   |    |    |    | ■ |

[FIG. 13]

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| RB0 | ▨ | ▨ | ▨ | ▨ |  |  |  |  |  |  |  |  |  | ■ |
| RB1 | ▨ | ▨ | ▨ | ▨ |  |  |  |  |  |  |  |  |  | ■ |
| RB2 | ▨ | ▨ | ▨ | ▨ |  |  |  |  |  |  |  |  |  | ■ |
| RB3 | ▨ | ▨ | ▨ | ▨ |  |  |  |  |  |  |  |  |  | ■ |
| RB4 |  |  |  |  |  |  |  |  | ▨ |  |  |  |  | ■ |
| RB5 |  |  |  |  |  |  |  |  | ▨ |  |  |  |  | ■ |
| RB6 |  |  |  |  |  |  |  |  | ▨ |  |  |  |  | ■ |
| RB7 |  |  |  |  |  |  |  |  | ▨ |  |  |  |  | ■ |
| RB8 |  |  |  |  | ▨ | ▨ | ▨ | ▨ |  |  |  |  |  | ■ |
| RB9 |  |  |  |  | ▨ | ▨ | ▨ | ▨ |  |  |  |  |  | ■ |
| RB10 |  |  |  |  | ▨ | ▨ | ▨ | ▨ |  |  |  |  |  | ■ |
| RB11 |  |  |  |  | ▨ | ▨ | ▨ | ▨ |  |  |  |  |  | ■ |

[FIG. 14]

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| RB0 | ▨ | ▨ | ▨ | ▨ |  |  |  |  |  |  |  |  |  | ■ |
| RB1 | ▨ | ▨ | ▨ | ▨ |  |  |  |  |  |  |  |  |  | ■ |
| RB2 | ▨ | ▨ | ▨ | ▨ |  |  |  |  |  |  |  |  |  | ■ |
| RB3 | ▨ | ▨ | ▨ | ▨ |  |  |  |  |  |  |  |  |  | ■ |
| RB4 |  |  |  |  |  |  |  |  |  |  |  |  |  | ■ |
| RB5 |  |  |  |  |  |  |  |  |  |  |  |  |  | ■ |
| RB6 |  |  |  |  |  |  |  |  |  |  |  |  |  | ■ |
| RB7 |  |  |  |  |  |  |  |  |  |  |  |  |  | ■ |
| RB8 |  |  |  |  | ▨ | ▨ | ▨ | ▨ | ▨ |  |  |  |  | ■ |
| RB9 |  |  |  |  | ▨ | ▨ | ▨ | ▨ | ▨ |  |  |  |  | ■ |
| RB10 |  |  |  |  | ▨ | ▨ | ▨ | ▨ | ▨ |  |  |  |  | ■ |
| RB11 |  |  |  |  | ▨ | ▨ | ▨ | ▨ | ▨ |  |  |  |  | ■ |

[FIG. 15]

|      | 0 | 1 | 2 | 3 | 4 | 5 | 6 | 7 | 8 | 9 | 10 | 11 | 12 | 13 |
|------|---|---|---|---|---|---|---|---|---|---|----|----|----|----|
| RB0  | ▨ | ▨ | ▨ | ▨ |   |   |   |   |   |   |    |    |    | ■  |
| RB1  | ▨ | ▨ | ▨ | ▨ |   |   |   |   |   |   |    |    |    | ■  |
| RB2  | ▨ | ▨ | ▨ | ▨ |   |   |   |   |   |   |    |    |    | ■  |
| RB3  | ▨ | ▨ | ▨ | ▨ |   |   |   |   |   |   |    |    |    | ■  |
| RB4  |   |   |   |   |   |   |   |   |   |   |    |    |    | ■  |
| RB5  |   |   |   |   |   |   |   |   |   |   |    |    |    | ■  |
| RB6  |   |   |   |   |   |   |   |   |   |   |    |    |    | ■  |
| RB7  |   |   |   |   |   |   |   |   |   |   |    |    |    | ■  |
| RB8  |   |   |   |   | ▨ | ▨ | ▨ | ▨ |   |   |    |    |    | ■  |
| RB9  |   |   |   |   | ▨ | ▨ | ▨ | ▨ |   |   |    |    |    | ■  |
| RB10 |   |   |   |   | ▨ | ▨ | ▨ | ▨ |   |   |    |    |    | ■  |
| RB11 |   |   |   |   | ▨ | ▨ | ▨ | ▨ |   |   |    |    |    | ■  |

|  | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| RB0 | ▨ | ▨ | ▨ | ▨ |  |  |  |  |  |  |  |  |  | ■ |
| RB1 | ▨ | ▨ | ▨ | ▨ |  |  |  |  |  |  |  |  |  | ■ |
| RB2 | ▨ | ▨ | ▨ | ▨ |  |  |  |  |  |  |  |  |  | ■ |
| RB3 | ▨ | ▨ | ▨ | ▨ |  |  |  |  |  |  |  |  |  | ■ |
| RB4 |  |  |  |  |  |  |  |  |  |  |  |  |  | ■ |
| RB5 |  |  |  |  |  |  |  |  |  |  |  |  |  | ■ |
| RB6 |  |  |  |  |  |  |  |  |  |  |  |  |  | ■ |
| RB7 |  |  |  |  |  |  |  |  |  |  |  |  |  | ■ |
| RB8 |  |  |  |  | ▨ | ▨ | ▨ | ▨ |  |  |  |  |  | ■ |
| RB9 |  |  |  |  | ▨ | ▨ | ▨ | ▨ |  |  |  |  |  | ■ |
| RB10 |  |  |  |  | ▨ | ▨ | ▨ | ▨ |  |  |  |  |  | ■ |
| RB11 |  |  |  |  | ▨ | ▨ | ▨ | ▨ |  |  |  |  |  | ■ |

[FIG. 18]
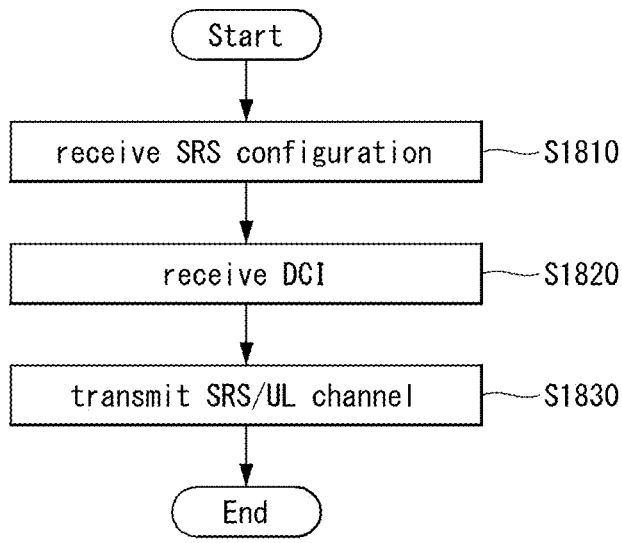
[FIG. 19]
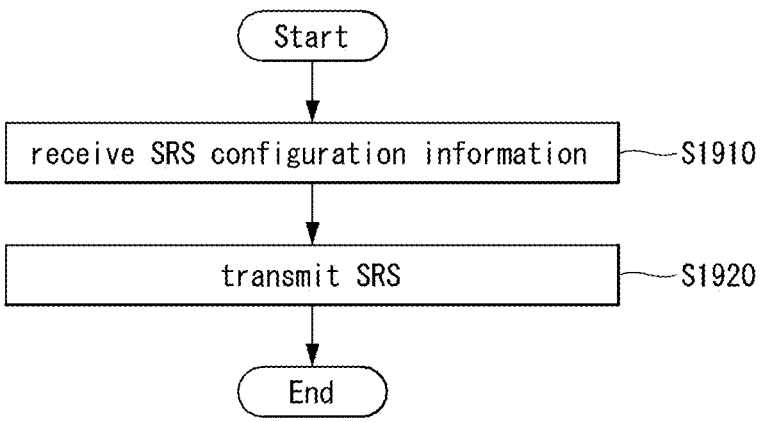

[FIG. 20]
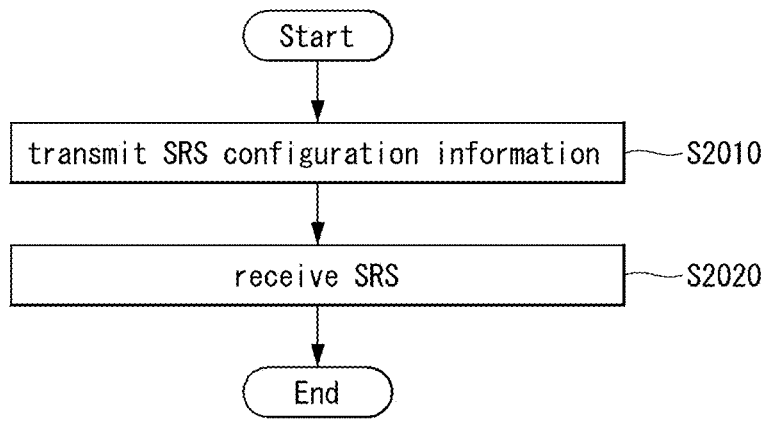
[FIG. 21]
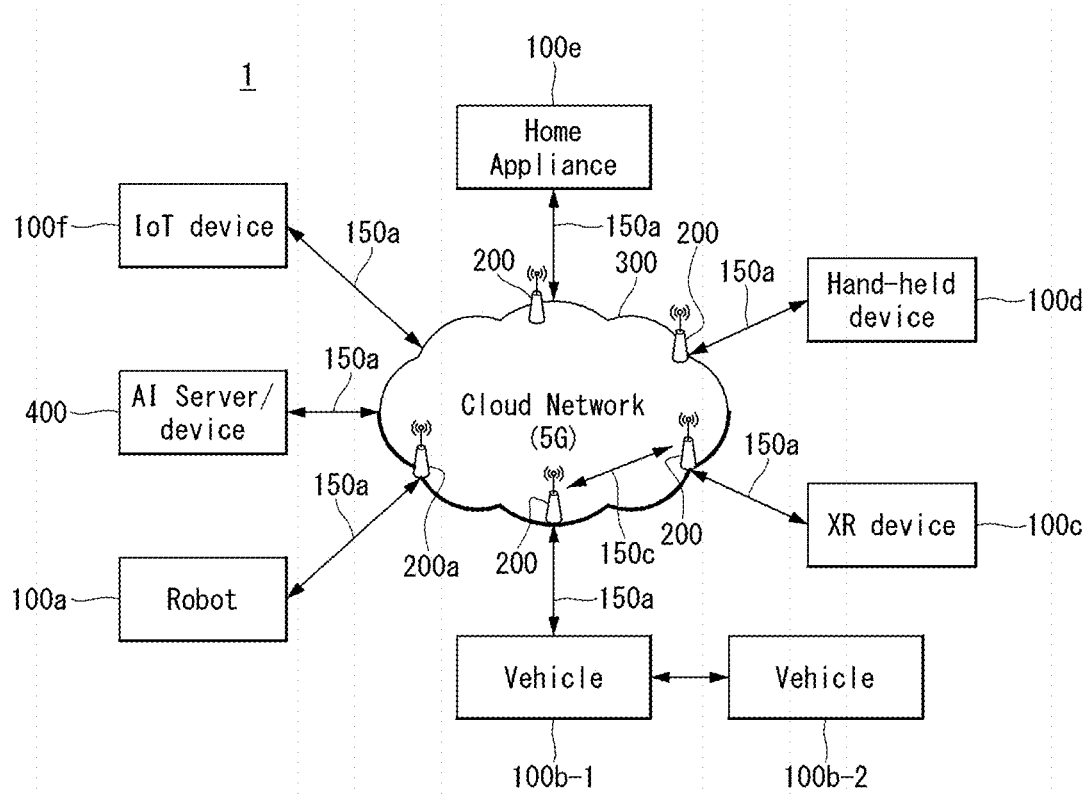

[FIG. 22]
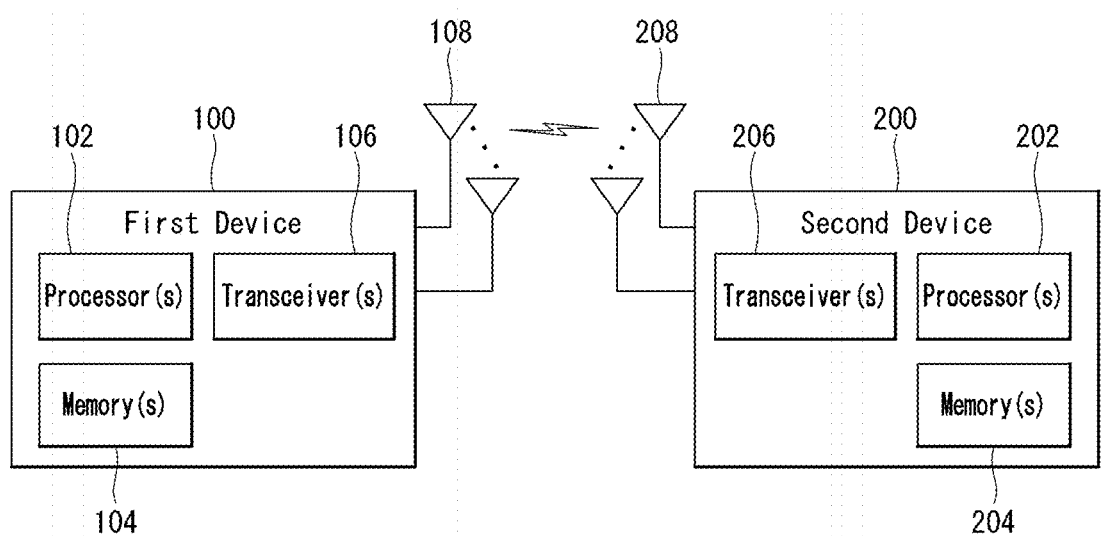

[FIG. 23]
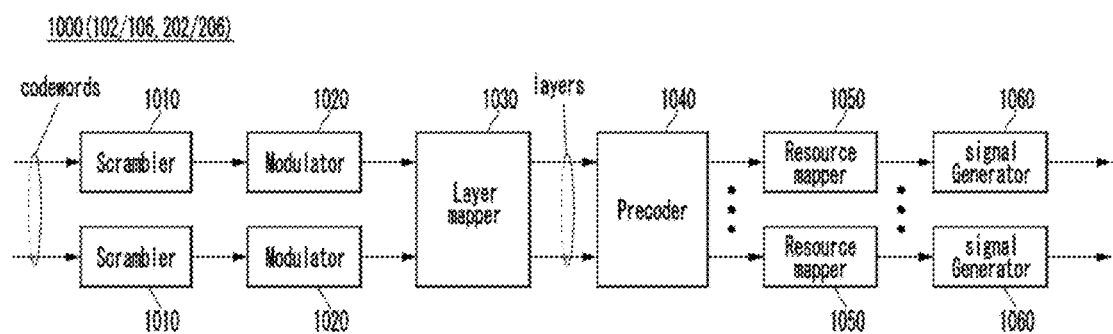

[FIG. 24]
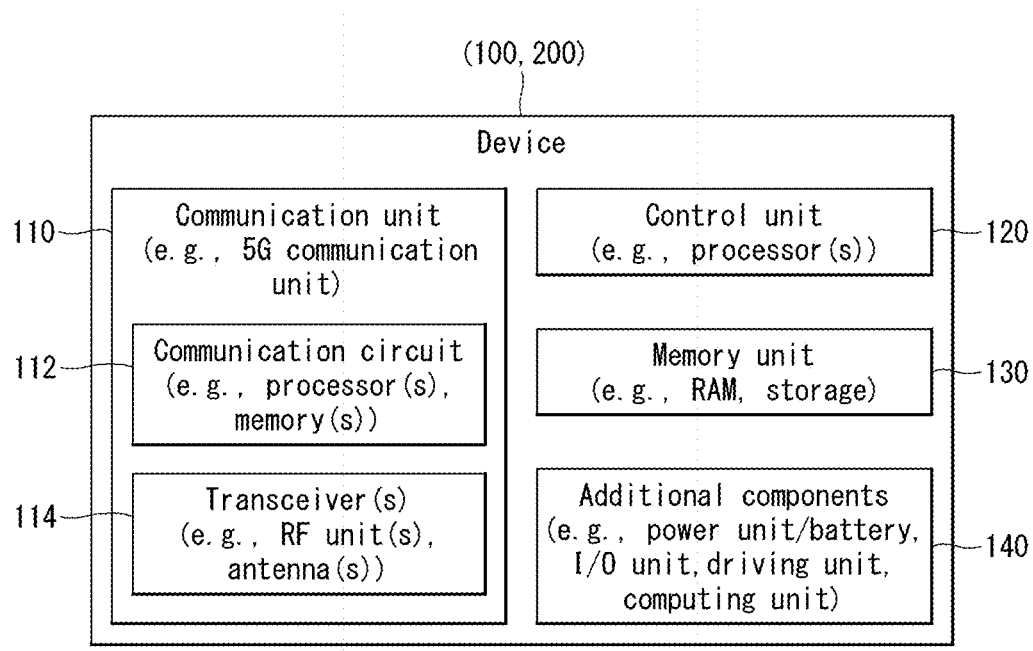

[FIG. 25]
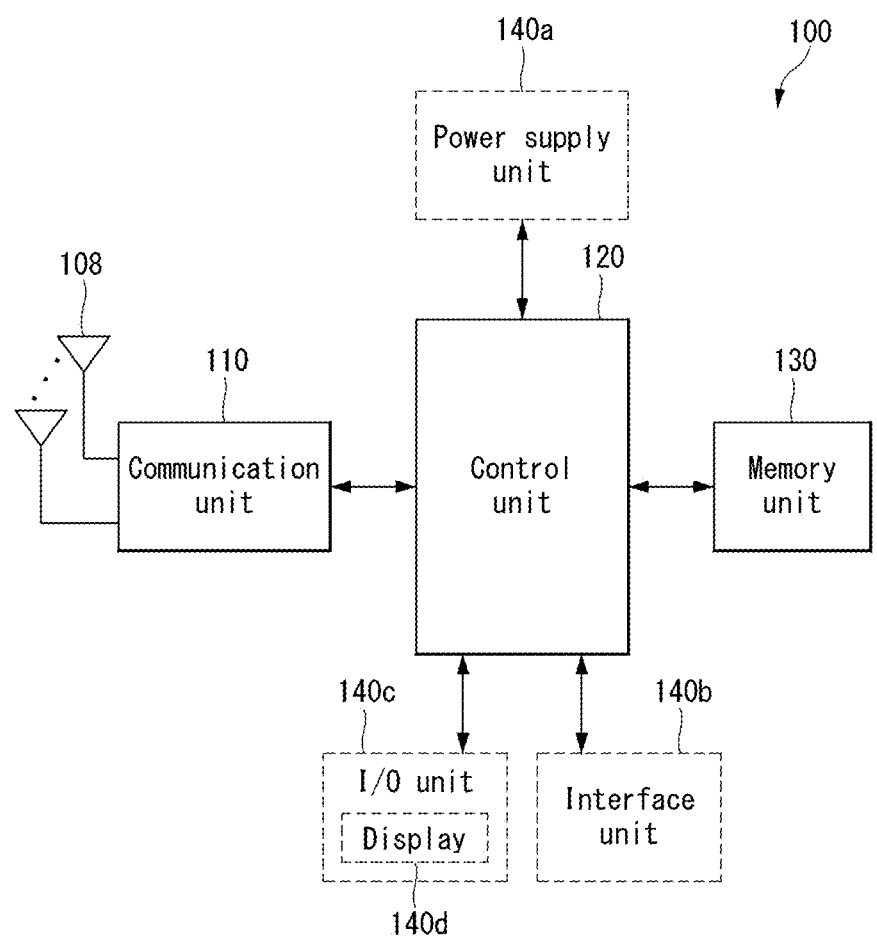

SOUNDING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/004250, filed on Mar. 27, 2020, which claims the benefit of U.S. Provisional Application No. 62/825,772, filed on Mar. 28, 2019, the contents of which is hereby incorporated by reference herein in its entirety.

TECHNICAL FIELD

The present disclosure relates to a method and device for transmitting and receiving a sounding reference signal in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

The present discloses proposes a method capable of resolving ambiguity in operation of a terminal (or a user equipment (UE)) due to setting of repetition and frequency hopping together in additional SRS transmission.

Objects of the disclosure are not limited to the foregoing, and other unmentioned objects would be apparent to one of ordinary skill in the art from the following description

Technical Solution

A method of transmitting a sounding reference signal (SRS) by a user equipment (UE) in a wireless communication system includes receiving configuration information related to transmission of the SRS and transmitting the SRS.

The configuration information include s information on at least one of the number of symbols of the SRS, repetition of the SRS, or frequency hopping of the SRS, and the SRS is repeatedly transmitted in a frequency range based on the frequency hopping and at least one symbol based on the repetition.

Last transmission of the repeated transmissions is performed based on a remainder value obtained by dividing the number of symbols of the SRS by the number of symbols based on the repetition.

The configuration information may include a repetition factor, and the repetition factor may be related to the number of symbols based on the repetition.

The remainder value may be greater than or equal to 1.

The last transmission may be performed in the frequency range based on the frequency hopping and a symbol based on the remainder value.

The last transmission may be performed in a frequency range in accordance with a previous repeated transmission and a symbol based on the remainder value.

The last transmission may be dropped.

The last transmission may be performed differently based on whether the remainder value is smaller than a value corresponding to ½ of the repetition factor.

Based on that the remainder value is greater than or equal to ½ of the repetition factor, the last transmission may be performed in the frequency range based on the frequency hopping and a symbol based on the remainder value.

Based on that the remainder value is smaller than ½ of the repetition factor, the last transmission may be performed in a frequency range in accordance with a previous repeated transmission and the symbol based on the remainder value.

Based on that the remainder value is smaller than ½ of the repetition factor, the last transmission may be dropped A user equipment (UE) for transmitting a sounding reference signal (SRS) in a wireless communication system includes one or more transceivers, one or more processors, and one or more memories configured to be operably connected to the one or more processors and store instructions for performing operations when transmission of the SRS is executed by the one or more processors.

The operations may include receiving configuration information related to transmission of the SRS and transmitting the SRS.

The configuration may include information on at least one of the number of symbols of the SRS, repetition of the SRS, or frequency hopping of the SRS, and the SRS may be repeatedly transmitted in a frequency range based on the frequency hopping and at least one symbol based on the repetition.

Last transmission of the repeated transmissions may be performed based on a remainder value obtained by dividing the number of symbols of the SRS by the number of symbols based on the repetition.

A device includes one or more memories and one or more processors functionally connected to the one or more memories.

The one or more processors may be configured such that the device receives configuration information related to transmission of the SRS and transmit the SRS.

The configuration may include information on at least one of the number of symbols of the SRS, repetition of the SRS, or frequency hopping of the SRS, and the SRS may be repeatedly transmitted in a frequency range based on the frequency hopping and at least one symbol based on the repetition.

Last transmission of the repeated transmissions may be performed based on a remainder value obtained by dividing the number of symbols of the SRS by the number of symbols based on the repetition.

One or more non-transitory computer-readable mediums store one or more instructions.

One or more instructions executable by one or more processors may be configured to receive configuration information related to transmission of the SRS and transmit the SRS.

The configuration information includes information on at least one of the number of symbols of the SRS, repetition of the SRS, or frequency hopping of the SRS, and the SRS is repeatedly transmitted in a frequency range based on the frequency hopping and at least one symbol based on the repetition.

Last transmission of the repeated transmissions may be performed based on a remainder value obtained by dividing the number of symbols of the SRS by the number of symbols based on the repetition.

A method of receiving a sounding reference signal (SRS) by a base station (BS) in a wireless communication system includes transmitting configuration information related to transmission of the SRS and receiving the SRS.

The configuration information may include information on at least one of the number of symbols of the SRS, repetition of the SRS, or frequency hopping of the SRS, and the SRS may be repeatedly transmitted in a frequency range based on the frequency hopping and at least one symbol based on the repetition.

Last transmission of the repeated transmissions may be performed based on a remainder value obtained by dividing the number of symbols of the SRS by the number of symbols based on the repetition.

A base station (BS) receiving a sounding reference signal (SRS) in a wireless communication system includes one or more transceivers, one or more processors, and one or more memories configured to be operably connected to the one or more processors and store instructions for performing operations when reception of the SRS is executed by the one or more processors.

The operations may include transmitting configuration information related to transmission of the SRS and receiving the SRS.

The configuration information may include information on at least one of the number of symbols of the SRS, repetition of the SRS, or frequency hopping of the SRS, and the SRS may be repeatedly transmitted in a frequency range based on the frequency hopping and at least one symbol based on the repetition.

Last transmission of the repeated transmissions may be performed based on a remainder value obtained by dividing the number of symbols of the SRS by the number of symbols based on the repetition.

Advantageous Effects

According to an embodiment of the present disclosure, when repetition and frequency hopping are set together in connection with transmission of additional SRS, last transmission of repeated transmissions of SRS is transmitted based on a remainder value obtained by dividing the number of symbols by a repetition factor. Therefore, when the number of symbols of the SRS set in the UE is not a multiple of the repetition factor, ambiguity in operation of the UE may be prevented.

According to an embodiment of the present disclosure, based on the remainder value being greater than or equal to 1, the last transmission is performed in a frequency domain according to a previous repeated transmission and a symbol based on the remainder value or dropped. Therefore, even when the number of SRS symbols is not a multiple of the repetition factor value, channel estimation may be performed under a uniform condition for each SRS hopping band.

According to an embodiment of the present disclosure, if the remainder value is greater than or equal to 1, the last transmission performed differently based on whether the remainder value is smaller than a value corresponding to ½ of the repetition factor. Accordingly, channel estimation may be performed under uniform conditions for each SRS hopping band, and channel estimation and frequency selective band utilization/scheduling of the base station may be more optimized.

The effects obtainable in the present disclosure are not limited to the effects mentioned above, and other effects not mentioned will be clearly understood by those skilled in the art to which the present invention pertains from the following description.

DESCRIPTION OF DRAWINGS

FIG. 1 shows the structure of a radio frame in a wireless communication system to which a method proposed in the disclosure may be applied.

FIG. 2 is a diagram illustrating a resource grid for one downlink slot in a wireless communication system to which a method proposed in the disclosure may be applied.

FIG. 3 shows the structure of a downlink subframe in a wireless communication system to which a method proposed in the disclosure may be applied.

FIG. 4 shows the structure of an uplink subframe in a wireless communication system to which a method proposed in the disclosure may be applied.

FIG. 5 illustrates physical channels and general signal transmission used in a 3GPP system.

FIG. 6 illustrates an uplink subframe including an SRS in a wireless communication system to which a method proposed in the disclosure may be applied.

FIG. 7 illustrates one example of a component carrier and carrier aggregation in a wireless communication system to which a method proposed in the present disclosure may be applied.

FIG. 8 illustrates an example a distinguishment of cells in a system supporting carrier aggregation, to which a method proposed in the present disclosure may be applied.

FIGS. 9 to 12 are views illustrating an example of multi-symbol SRS transmission to which the method proposed in the present disclosure is applied.

FIGS. 13 to 17 are views illustrating another example of multi-symbol SRS transmission to which the method proposed in the present disclosure is applied.

FIG. 18 is a flowchart illustrating an operation of a terminal to which the method proposed in the present disclosure may be applied.

FIG. 19 is a flowchart illustrating a method of transmitting a sounding reference signal by a terminal in a wireless communication system according to an embodiment of the present disclosure.

FIG. 20 is a flowchart illustrating a method of receiving a sounding reference signal by a base station in a wireless communication system according to another embodiment of the present disclosure.

FIG. 21 illustrates a communication system 1 applied to the present disclosure.

FIG. 22 illustrates wireless devices applicable to the present disclosure.

FIG. 23 illustrates a signal process circuit for a transmission signal.

FIG. 24 illustrates another example of a wireless device applied to the present disclosure.

FIG. 25 illustrates a hand-held device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts may obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System

FIG. 1 shows the structure of a radio frame in a wireless communication system to which a method proposed in the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

(a) of FIG. 1 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 1 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switchpoint periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which a method proposed in the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which a method proposed in the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information on the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information on the resource allocation and transport format of a downlink shared channel (DL-SCH) (this is also called an "downlink grant"), resource allocation information on an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which a method proposed in the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 6 illustrates an uplink subframe including an SRS in a wireless communication system to which a method proposed in the disclosure may be applied.

Referring to FIG. 6, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(p_i)}(n,l') = r_{u,v}^{(\alpha_i,\delta)}(n)$$

$$0 \leq n \leq 271 \cdot N_{SC}^{RB}/K_{TC}$$

$$l' \in \{0, 1, \ldots, N_{symb}^{SRS}-1\} \quad \text{[Equation 1]}$$

In Equation 1, $r_{u,v}^{(\alpha_i,\delta)}(n)$ denotes the sequence number (v) of SRS and the sequence set by the sequence group (u), and the transmission comb (TC) number, $K\_TC^{(K_{TC})}$, may be included in the higher layer parameter, SRS-Transmission-Comb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}} \quad \text{[Equation 2]}$$

$$n_{SRS}^{cs,i} = \left(n_{SRS}^{cs} + \frac{n_{SRS}^{cs,max} p_i}{N_{ap}}\right) \bmod n_{SRS}^{cs,max}$$

In Equation 2, $n_{SRS}^{cs} \in \{0, 1, \ldots, n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{cs,max}=12$) and, if K_TC is 2, 8 (i.e., $n_{SRS}^{cs,max}=8$).

The sequence group (u)(u=$(f_{gh}(n_{s,f}^\mu, l')+n_{ID}^{SRS})$ mod 30)mod 30) and the sequence number (u) may comply with the higher layer parameter SRS-GroupSequenceHopping. Further, the SRS sequence identifier $n_{ID}^{SRS}$ may be given by the higher layer parameter SRS-SequenceID. l' (i.e., l'$\in\{0, 1, \ldots, N_{symb}^{SRS}-1\}$ denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}^\mu, l') = 0$$

$$v = 0 \quad \text{[Equation 3]}$$

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f}^\mu, l') = (\Sigma_{m=0}^{7} c(8(n_{s,f}^\mu N_{symb}^{SRS}+l')+m) \cdot 2^m) \bmod 30 \quad \text{[Equation 4]}$$

$$v = 0$$

In Equation 4, f_gh(x, y) denotes sequence group hopping, and v denotes sequence hopping. C(i) denotes the pseudo-random sequence and may be initialized as $c_{init} = \lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f}, l') = 0 \quad \text{[Equation 5]}$$

$$v = \begin{cases} c(n_{s,f} N_{symb}^{SRS} + l') & M_{sc,b}^{SRS} \geq 3N_{sc}^{RB} \\ 0 & \text{otherwise} \end{cases}$$

In Equation 5, f_gh(x, y) denotes sequence group hopping, and v denotes sequence hopping. C(i) denotes the pseudo-random sequence and may be initialized as $c_{init} = \lfloor n_{ID}^{SRS}/30 \rfloor \cdot 2^5 + (n_{ID}^{SRS} + \Delta_{SS}) \bmod 30$ at the start of each radio frame (where, $\Delta_{SS} \in \{0, 1, \ldots, 29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

[Equation 6]

$$k_0^{(p)} = \bar{k}_0^{(p)} + \sum_{b=0}^{B_{SRS}} {}'K_{TC} M_{sc,b}^{RS} n_b$$

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2)\left\lfloor \frac{n_{SRS} \bmod \Pi_{b'=b_{hop}}^{b} N_{b'}}{\Pi_{b'=b_{hop}}^{b-1} N_{b'}} \right\rfloor + \left\lfloor \frac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases}$$

$$n_{SRS} = \begin{cases} 2N_{SP} n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor & \text{otherwise} \end{cases}$$

In Equation 6, nSRS means the hopping interval in the time domain, and Nb denotes the number of branches allocated to tree level b where b may be determined by the BSRS configuration in the dedicated RRC.

FIG. 7 illustrates one example of a component carrier and carrier aggregation in a wireless communication system to which a method proposed in the present disclosure may be applied.

(a) of FIG. 7 shows a single carrier structure defined in the LTE system. Two types of component carriers are used: DL CC and UL CC. A component carrier may have frequency bandwidth of 20 MHz.

(b) of FIG. 7 shows a carrier aggregation structure used in the LTE A system. (b) of FIG. 7 shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 8 illustrates an example a distinguishment of cells in a system supporting carrier aggregation, to which a method proposed in the present disclosure may be applied.

Referring to FIG. 8, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

The contents described above may be applied in combination with the methods proposed in the present disclosure to be described later or may be supplemented to clarify the technical characteristics of the methods proposed in the present disclosure. Of course, the methods described below are only classified for convenience of description, and some components of any one method may be substituted with some components of another method or may be applied in combination with each other.

Hereinafter, items related to additional SRS will be described.

First, the contents related to a trigger type of a sounding reference signal (SRS) and the relationship between SRS transmission and PUSCH (PUCCH) transmission will be described in detail.

An SRS may be transmitted in the last symbol of each subframe in a frequency division duplex (FDD) system.

In a time division duplex (TDD) system, in addition to SRS transmission in an uplink subframe, an SRS having one or two symbols may be transmitted according to a special subframe configuration by utilizing uplink pilot timeslot (UpPTS).

In the special subframe, SRS having 2 or 4 symbols may be transmitted depending on whether SC-FDMA symbols are configured for additional uplink use in addition to the existing UpPTS.

In the SRS, a trigger type is classified as type 0 and type 1 according to time domain characteristics. In the case of type 0, it is a periodic SRS (periodic SRS) based on the higher layer configuration, and in the case of type 1, it is an aperiodic SRS triggered by DCI.

In the LTE standard, a transmission method of a UE for a configured SRS may vary according to higher layer parameters such as srs-Bandwidth and srs-HoppingBandwidth accompanying in the SRS configuration between the base station and the UE. For example, if the value of srs-HoppingBandwidth is greater than a value of srs-Bandwidth, frequency hopping is not set and repetition is set, so that the UE should perform a corresponding operation (repetition) during SRS transmission. Conversely, if the value of srs-HoppingBandwidth is smaller than the value of srs-Bandwidth, frequency hopping is set according to a predefined hopping pattern and the UE should perform a corresponding operation (frequency hopping) during SRS transmission.

A repetition factor R was added in the NR Rel-15 standard. The repetition factor R is a parameter related to repetition and frequency hopping of the SRS. Through the repetition factor R, repetition and hopping are simultaneously set within one subframe, and the UE may perform corresponding operations (repetition and frequency hopping).

Hereinafter, an agreement related to LTE MIMO enhancement (additional SRS) that may be applied to the method proposed in the disclosure is described.

1. Agreement (scenarios considered for additional SRS)
The work for additional SRS symbols in this WI should consider the following scenarios
TDD for non-CA
TDD only CA
FDD-TDD CA 2. Agreement (position in time domain of additional SRS symbol)
Positions in the time domain of additional SRS symbols possible in one general UL subframe for a cell include:
Option 1: Use all symbols in one slot for SRS from a cell perspective
For example, another slot of the subframe may be used for PUSCH transmission for an sTTI capable UE.
Option 2: Use all symbols in one subframe for SRS from a cell perspective
Option 3: A subset of symbols in one slot may be used for SRS from a cell perspective
However, the position of the additional SRS is not limited to the above-described options.
For an area with a low downlink SINR, support of an additional SRS symbol per UE in a normal subframe may bring a gain in downlink performance.

3. Agreement (aperiodic SRS support)
Aperiodic SRS transmission may be supported for additional SRS symbols.

4. Agreement (transmission of additional SRS)
A UE configured with an additional SRS in one UL subframe may transmit the SRS based on any one of the following options.

Option 1: Frequency hopping is supported within one UL subframe.
Option 2: Repetition within one UL subframe is supported.
Option 3: Both frequency hopping and repetition are supported within one UL subframe.

5. Agreement
Both intra-subframe frequency hopping and repetition are supported for aperiodic SRS in additional symbols).

6. Agreement (additional SRS and antenna switching)
Antenna switching within a subframe is supported for aperiodic SRS in an additional SRS symbol.

The term additional SRS symbol is additionally introduced in Rel-16 and the last symbol is not part of the additional SRS symbol.

7. Agreement (transfer of legacy SRS and additional SRS)
Both legacy SRS and additional SRS symbol(s) may be configured for the same UE.
If the legacy SRS is aperiodic, the UE may transmit the legacy SRS or additional SRS symbol(s) in the same subframe.
If the legacy SRS is periodic, the UE may transmit the legacy SRS and additional SRS symbol(s) in the same or different subframes.

8. Agreement (number of symbols in additional SRS)
The number of symbols that may be configured in the UE as an additional SRS is 1-13.

The following may be considered in relation to the determination of future agreements.
Subframe frequency hopping and repetition of additional SRS symbols (For intra-subframe frequency hopping and repetition of additional SRS symbols)
The following may be discussed in support of repetition and frequency hopping.
$n_{SRS}=\lfloor l/R \rfloor$ value. Here, $l \in \{0, 1, \ldots, M_{symb}^{SRS}-1\}$ is the number of symbols.
$N_{symb}^{SRS}$ value. Here, $N_{symb}^{SRS}$ is the number of configured SRS symbols, and R is the repetition factor for the configured UE
Application to non-periodic SRS
Whether legacy SRS and additional SRS symbols have the same hopping pattern
Whether flexible configuration (e.g., comb/comb offset configuration) is supported for repetition of additional SRS symbols)

9. Agreement
For the temporal position of possible additional SRS (SRS) symbols in one general UL subframe for a cell:
use 1 to 13 symbols in one subframe for SRS from a cell point of view 10. Agreement (power control)
Same power control configuration applies for all additional SRS symbols configured to a single UE.

11. Agreement
Transmission of aperiodic legacy SRS and aperiodic additional SRS symbol(s) in the same subframes for a UE is supported.

In the UL normal subframe of the LTE TDD system up to Rel-15, both a cell-specific SRS for a specific cell and a UE-specific SRS for a specific UE may be configured only in one symbol (last symbol) in one subframe.

As described above, in the Rel-16 LTE MIMO enhancement, only the aperiodic SRS in the additional SRS of the UL normal subframe is preferentially supported.

Additional SRS (additional SRS) is different from the purpose of legacy SRS.

Legacy SRS is utilized for several purposes. Specifically, the purposes of the legacy SRS include:

obtaining UL CSI for UL scheduling or obtaining UL link adaptation or DL CSI for DL scheduling utilizing DL/UL reciprocity On the other hand, unlike legacy SRS, additional SRS may be seen as an SRS mainly targeting obtaining DL information of each cell using DL/UL reciprocity in a single serving cell or multi-cell (CA environment).

In the case of additional SRS, unlike legacy SRS (legacy SRS) transmitted only in the last symbol of the existing uplink normal subframe (UL normal subframe), the SRS may be transmitted through multi-symbols in other symbol positions excluding the last symbol.

Currently, in one uplink subframe (UL subframe), as multi symbol SRS, first to $13^{th}$ symbol, excluding a legacy SRS (the last symbol) may be set from a cell perspective or a UE perspective.

In order to enhance capacity and coverage in the flexibly configurable multi-symbol SRS as described above, repetition and frequency hopping should be accompanied. If the repetition factor value of the existing NR standard is used, the set total number of symbols and the multiple value of the repetition factor are not the same, and thus, ambiguity may occur in the operation of the UE.

For example, when it is assumed that the number of symbols of multi-symbol SRS configured in one uplink subframe for a certain UE is 9 and the SRS repetition factor set at the same time is 4, the UE may operate as follows.

The UE sequentially transmits SRS for the set 9 symbols. First, the UE performs repetition on the first 4 symbols. In this disclosure, performing repetition refers to transmitting the SRS in symbol(s) according to the repetition factor value. In this case, SRS transmission may or may not involve frequency hopping.

Next, the UE performs repetition on the second four symbols in a frequency domain according to frequency hopping. Here, how the last SRS transmission should be performed is a problem. Specifically, ambiguity occurs in the operation of the UE as to how SRS transmission should be performed ON the last remaining symbol after SRS transmission in 8 symbols according to the repetition factor 4 among 9 symbols.

The present disclosure proposes methods for solving this problem. Specifically, the present disclosure proposes a method of configuring and indicating repetition of intra subframe/inter subframe and frequency hopping for multi-symbol SRS between a BS and a UE and describes a UE operation based on the corresponding configuration.

Hereinafter, in this disclosure, as a term for referring to SRS configured in at least one symbol (e.g., 1 to 13 symbols) other than the last symbol in a subframe, multi symbol SRS and additional SRS are used in combination. However, this is for convenience of description of each embodiment and is not intended to differently limit the technical scope according to each term.

A UE to which at least one of the proposals in the present disclosure is applied is referred to as an "enhanced UE" for convenience, and includes, for example, a case in which the additional SRS (or transmission of a plurality of SRSs within a single subframe), such as a Rel-16 UE, is set/applied/transmitted.

Hereinafter, matters related to embodiment 1 will be described.

[Method 1]

Hereinafter, a method of setting/indicating repetition between intra subframe and inter subframe for multi symbol SRSs between BS and a UE and frequency hopping and a corresponding UE operation is described.

In order to remove the ambiguity in the operation of the UE that occurs during the transmission of the SRS based on the repetition and frequency hopping described above, an additional SRS may be set based on the following proposal 1/proposal 2. The BS/UE may operate based on the corresponding setting.

[Proposal 1]

The number of symbols of the multi-symbol SRS that the BS may set for the UE may be limited to a multiple of the repetition factor (in one subframe). According to an embodiment, the restriction on the number of symbols of the multi-symbol SRS described above may be applied only when SRS repetition is set in the corresponding UE.

In the case of NR, a repetition factor R may be set as {1, 2, 4}. The BS may set a repetition factor value for the enhanced UE after LTE Rel-16 within the range of 1 to 13. For example, in the configuration of multi-symbol SRS, a repetition factor value may be {1, 2, 4, 8} (or {1, 2, 4, 8, 12}). Accordingly, the number of symbols of the multi-symbol SRS that the BS may set for the UE may be limited to {1, 2, 4, 6, 8, 10} (or {1, 2, 4, 6, 8, 10, 12}).

[Proposal 2]

There may be no limit to the number of symbols of the multi-symbol SRS that the BS may set to the UE (in one subframe). That is, the number of symbols n of the configured SRS may be 1 to 13. At this time, when the number of symbols n in multi-symbol SRS is not divided by the repetition factor R (e.g., {1, 2, 4, 8} or {1, 2, 4, 8, 12}), the UE may operate as follows.

For n-(n mod R) symbols, the UE performs repetition based on frequency hopping by R symbols.

After transmitting the SRS for the n-(n mod R) symbols, the last SRS transmission may be performed as follows. Specifically, for the remaining n mod R SRS symbol(s), the UE may operate based on at least one of options 1 to 4 below.

Option 1) The UE may perform repetition for n mod R symbols based on frequency hopping according to a preset hopping pattern.

Option 2) The UE ignores the preset hopping pattern and may perform repetition as many as n mod R in the frequency band in which the repetition was performed just before. Specifically, the UE may perform repetition on n mod R symbols while maintaining the same frequency band as the previous frequency band. That is, the UE may transmit the SRS of n mod R symbols in the SRS frequency bandwidth of the n-(n mod R)-th SRS symbol.

Option 3) The UE ignores the configuration of the BS and may drop the SRS transmission.

Option 4) If the remaining symbols (n mod R symbols) are greater than or equal to R/2, the UE operates according to option 1, otherwise it may operate according to option 2 or option 3.

Hereinafter, an application example of the proposal 2 will be described with reference to FIGS. 9 to 12.

FIGS. 9 to 12 are views illustrating an example of multi-symbol SRS transmission to which the method proposed in the present disclosure is applied. In FIGS. 9 to 12, the vertical axis is a frequency domain and the horizontal axis is a time domain.

It is assumed that the number of symbols n of the additional SRS set by the BS for the UE is 11 (symbol 0 to 10) and the repetition factor R is 4. The UE transmits multi-symbol SRS based on proposal 2 above.

Referring to FIG. 9, the UE may transmit a multi-symbol SRS based on option 1 of proposal 2. 1) The UE transmits SRS of 4 symbols in time domain symbols 0 to 3 and frequency domain RB0 to RB3. 2) The UE transmits the SRS of 4 symbols in the time domain symbols 4 to 7 and the frequency domain RB8 to RB11 according to frequency hopping. 3) The UE transmits the SRS of the remaining 3 symbols (11 mod 4 symbols) in the time domain symbols 8 to 10 and the frequency domains RB4 to RB7 according to frequency hopping.

Referring to FIG. 10, the UE may transmit a multi-symbol SRS based on option 2 of proposal 2. 1) The UE transmits SRS of 4 symbols in time domain symbols 0 to 3 and frequency domains RB0 to RB3. 2) The UE transmits the SRS of 4 symbols in the time domain symbols 4 to 7 and the frequency domain RB8 to RB11 according to frequency hopping. 3) The UE transmits the SRS of the remaining 3 symbols (11 mod 4 symbols) in the time domain symbols 8 to 10 and the previous frequency domains RB8 to RB11.

Referring to FIG. 11, the UE may transmit a multi-symbol SRS based on option 3 of proposal 2. The UE transmits SRS for 8 symbols in the same manner as in FIGS. 9 and 10 described above, and drops SRS transmission for the remaining 3 symbols (11 mod 4 symbols).

Referring to FIG. 12, the UE may transmit multi-symbol SRS based on option 4 of proposal 2. The remaining number of symbols is 3 (1 lmod4), which is greater than ½ (i.e., 2) of the repetition factor value. Therefore, the UE may transmit the multi-symbol SRS according to option 1 of proposal 2. That is, the UE may transmit the multi-symbol SRS as in FIG. 9.

Figure 16:
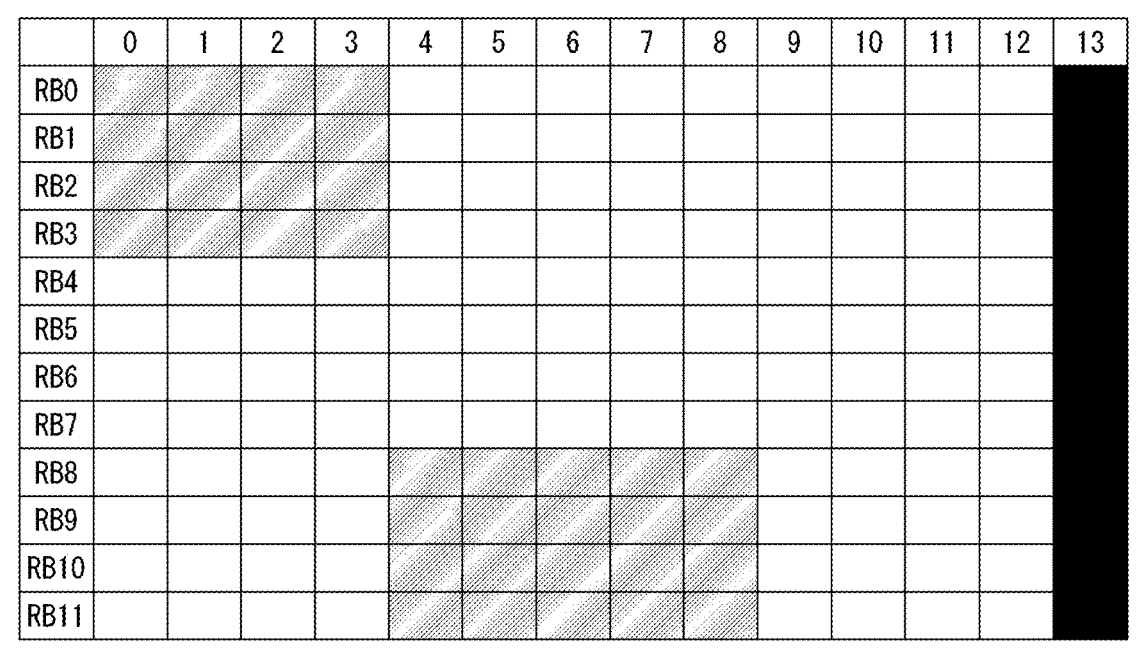

Hereinafter, another application example of the proposal 2 will be described with reference to FIGS. 13 to 17.

FIGS. 13 to 17 are views illustrating another example of multi-symbol SRS transmission to which the method proposed in the present disclosure is applied. In FIGS. 13 to 17, the vertical axis is a frequency domain and the horizontal axis is a time domain.

It is assumed that the number of symbols n of the additional SRS configured by the BS for the UE is 9 (symbols 0 to 8) and the repetition factor R is 4. The UE transmits multi-symbol SRS based on proposal 2 above.

Referring to FIG. 13, the UE may transmit multi-symbol SRS based the option 1 of proposal 2. 1) The UE transmits SRS of 4 symbols in time domain symbols 0 to 3 and frequency domains RB0 to RB3. 2) The UE transmits the SRS of 4 symbols in the time domain symbols 4 to 7 and the frequency domain RB8 to RB11 according to frequency hopping. 3) The UE transmits the SRS of the remaining 1 symbol (9 mod 4 symbols) in the time domain symbol 8 and the frequency domains RB4 to RB7 according to frequency hopping.

Referring to FIG. 14, the UE may transmit multi-symbol SRS based on option 2 of proposal 2. 1) The UE transmits SRS of 4 symbols in time domain symbols 0 to 3 and frequency domains RB0 to RB3. 2) The UE transmits the SRS of 4 symbols in the time domain symbols 4 to 7 and the frequency domain RB8 to RB11 according to frequency hopping. 3) The UE transmits the SRS of the remaining 1 symbol (9 mod 4 symbols) in the time domain symbol 8 and the previous frequency domains RB8 to RB11.

Referring to FIG. 15, the UE may transmit multi-symbol SRS based on option 3 of proposal 2. The UE transmits SRS for 8 symbols in the same manner as in FIGS. 13 and 14 described above and drops SRS transmission for the remaining 1 symbol (9 mod 4 symbols).

Referring to FIGS. 16 and 17, the UE may transmit a multi-symbol SRS based on option 4 of proposal 2. The remaining number of symbols is 1 (9 mod 4) and a corresponding value is less than ½ (i.e., 2) of the repetition factor value. The UE may transmit a multi-symbol SRS in the same manner as in FIG. 14 based on option 2 of proposal 2 (FIG. 16) or, alternatively, the UE may transmit the multi-symbol SRS as in FIG. 15 based on option 3 of proposal 2 (FIG. 17).

Hereinafter, an example of a UE operation based on method 1 is as follows.

Step 0) SRS configuration is received

Step 0-1) Configuration to transmit SRS in one or more symbol is received

Step 0-1-1)—Information that may be included in configuration is (36.331 SoundingRS-UL-Config)

Step 0-2) SRS may be transmitted periodically or aperiodically.

Step 1) SRS trigger is received through DL/UL grant (through PDCCH) or SRS transmission time based on RRC configuration arrives Step 1-1) (If repetition is set)

Step 1-1-1) Operation according to proposal 1

Step 1-1-2) Operation according to proposal 2 (options 1-4) if n is not divisible by R Step 1-2) (If repetition is not set)

Step 1-2-1) Same operation as existing LTE

Not all of the above steps are essential, and some steps may be omitted depending on a situation of the UE.

Hereinafter, the effects according to embodiment 1 described above are described in detail.

<In the Case of Method 1>

Proposal 1 does not cause ambiguity in UE operation by limiting the set number of SRS symbols to be unconditionally divided by a repetition factor value.

In proposal 2, it is defined how the UE should operate with respect to remaining symbols as a remainder value when the set number of SRS symbols is not divided by the repetition factor value. In this respect, ambiguity in the operation of the UE does not occur as in the above proposal 1.

The purpose of setting the repetition and frequency hopping of the SRS at the same time is to secure a coverage gain through repetition and hopping, and the UE performs sounding on the full band.

Considering the above purpose, if the number of SRS symbols set is not divided by a repetition factor value, channel estimation of the BS may be performed under unequal conditions. Specifically, channel estimation for SRS transmission of the remaining symbols (e.g., 1 symbol) is performed under a different condition (e.g., insufficient power) from a band in which repetition was previously performed. As a result, channel estimation performance may be degraded.

Option 2/Option 3 may prevent the above situation. That is, channel estimation of the BS for each repeated transmission of the SRS may be performed under equal (or the same) conditions.

In option 4, in consideration of the purpose of the simultaneous setting of the repetition and frequency hopping, the condition (e.g., whether it is less than ½ of the argument value) for the number of remaining symbols is added to the operation according to option 1 or option 2 (option 3). Accordingly, channel estimation may be performed under a uniform condition for each SRS hopping band, and ambiguity in UE operation is resolved. In addition, channel estimation and frequency selective band utilization/scheduling of the BS may be more optimized.

In terms of implementation, the operation of the BS/UE according to the embodiments described above (e.g., operation related to SRS transmission based on at least one of option 1/option 2/option 3/option 4 of proposal 1 and proposal 2) may be processed by the device of FIGS. 21 to 25 (e.g., the processors 102 and 202 of FIG. 22), which will be described later.

In addition, the operation of the BS/UE according to the embodiments described above (e.g., operation related to SRS transmission based on at least one of option 1/option 2/option 3/option 4 of proposal 1 and proposal 2) may be stored in a memory (e.g., 104 and 204 of FIG. 22) in the form of an instruction/program (e.g., instruction, executable code) for driving at least one processor (e.g., 102 and 202 of FIG. 22).

FIG. 18 is a flowchart illustrating the operation of a UE to which the method proposed in the present disclosure may be applied. FIG. 18 is only for convenience of description and does not limit the scope of the present disclosure.

Referring to FIG. 18, a case in which the UE performs uplink transmission (e.g., UL channel, additional SRS, etc.) based on the method described in Method 1 (Proposals 1 and 2) of Embodiment 1 described above is assumed.

The UE may receive the SRS configuration from the BS or the like (S1810). For example, as in step 0) of method 1 described above, the UE may receive an SRS configuration including information related to SRS (e.g., additional SRS, UpPts SRS) transmission.

The UE may receive DCI related to transmission such as SRS and/or UL channel (S1820). This may be replaced by an RRC setting.

Thereafter, the UE may transmit SRS and/or UL channel(s) based on the received SRS configuration, DCI, and/or predefined rules (e.g. priority rule, etc.) (S1830). As an example, in multi-symbol SRS transmission, the UE may transmit SRS and/or UL channel(s) such as the rules described in Method 1 (Proposals 1 and 2).

It is obvious that a reception operation of the UE in FIG. 18 may be understood as a transmission operation of the BS, and a transmission operation of the UE may be understood as a reception operation of the BS.

The operation of the UE/BS described above may be implemented using the device described in FIGS. 21 to 25, and some of the entities may be omitted. For example, referring to FIG. 22, at least one processor 102/2022 may control at least one transceiver 106/206 to transmit and receive channels/signals/data/information (e.g., SRS configuration, UL/DL DCI, Additional SRS, PDCCH, PDSCH, PUSCH, PUCCH, PHICH, etc.) and may control at least one memory 104/204 to store channel/signal/data/information, etc. to be transmitted or received.

Hereinafter, the embodiments described above are described in detail with reference to FIG. 19 in terms of the operation of the UE. Of course, the methods described below are only classified for convenience of description, and some components of one method may be substituted with some components of another method or coupled to be applied to each other.

FIG. 19 is a flowchart illustrating a method for a UE to transmit a sounding reference signal in a wireless communication system according to an embodiment of the present disclosure.

Referring to FIG. 19, a method of transmitting a sounding reference signal by a UE in a wireless communication system according to an embodiment of the present invention may include an SRS configuration information receiving step (S1910) and an SRS transmission step (S1920).

In S1910, the UE receives configuration information related to transmission of a sounding reference signal (SRS) from the BS. The SRS may be configured in at least one symbol other than the last symbol of the subframe. The SRS may be an additional SRS.

According to an embodiment, the configuration information may include information on at least one of the number of symbols of the SRS, repetition of the SRS, or frequency hopping of the SRS. For example, the configuration information may include a repetition factor. The repetition factor may be related to the number of symbols based on the repetition.

According to S1910 described above, the operation of UE (100/200 in FIGS. 21 to 25) receiving the configuration information related to transmission of a sounding reference signal (SRS) from the BS (100/200 in FIGS. 21 to 25) may be implemented by the device of FIGS. 21 to 25. For example, referring to FIG. 22, the one or more processors 102 may control one or more transceivers 106 and/or one or more memories 104 to receive configuration information related to the sounding reference signal (SRS) from the BS 200.

In S1920, the UE transmits the SRS to the BS.

The SRS may be transmitted aperiodically, periodically or semi-persistently. The SRS may be transmitted based on triggering of downlink control information or RRC configuration.

According to an embodiment, the SRS may be repeatedly transmitted in a frequency domain based on the frequency hopping and at least one symbol based on the repetition.

The last transmission of the repeated transmissions may be performed based on a remainder value obtained by dividing the number of symbols of the SRS by the number of symbols based on the repetition.

In this case, the remainder value may be greater than or equal to 1. The remainder value may not be 0, and the number of symbols of the SRS may not be a multiple of the number of symbols based on the repetition. In this case, the following operations may be considered to prevent ambiguity in operation of the UE and to achieve coverage gain and sounding of the full frequency band.

The last transmission may be performed in a frequency domain based on the frequency hopping and a symbol based on the remainder value. This embodiment may be based on option 1 of proposal 2.

The last transmission may be performed in a frequency domain according to previous repeated transmission and a symbol based on the remainder value. This embodiment may be based on option 2 of proposal 2.

The last transmission may be dropped. This embodiment may be based on option 3 of proposal 2.

The last transmission may be performed differently based on whether the remainder value is smaller than a value corresponding to ½ of the repetition factor. This embodiment may be based on option 4 of proposal 2.

Based on that the residual value is greater than or equal to ½ of the repetition factor, the last transmission may be performed in a frequency domain based on the frequency hopping and a symbol based on the residual value.

Based on that the remainder value is less than ½ of the repetition factor, the last transmission may be performed in a frequency domain according to the previous repetition transmission and a symbol based on the remainder value.

Based on that the remainder value is less than ½ of the repetition factor, the last transmission may be dropped.

According to S1920, the operation of the UE (100/200 in FIGS. 21 to 25) transmitting the SRS to the BS (100/200 in FIGS. 21 to 25) may be implemented by the device of FIGS. 21 to 25. For example, referring to FIG. 22, one or more processors 102 may control one or more transceivers 106 and/or one or more memories 104 to transmit the SRS to BS 200.

Hereinafter, the embodiments described above are described in detail with reference to FIG. 20 in terms of the operation of the BS. Of course, the methods described below are only classified for convenience of description, and some components of one method may be substituted with some components of another method or may be coupled to be applied with each other.

FIG. 20 is a flowchart illustrating a method of receiving a sounding reference signal by a BS in a wireless communication system according to another embodiment of the present disclosure.

Referring to FIG. 20, a method of receive a sounding reference signal by a BS in a wireless communication system according to another embodiment of the present invention may include an SRS configuration information transmission step (S2010) and an SRS reception step (S2020).

In S2010, the BS transmits configuration information related to transmission of a sounding reference signal (SRS) to the UE. The SRS may be configured in at least one symbol other than the last symbol of the subframe. The SRS may be an additional SRS.

According to an embodiment, the configuration information may include information on at least one of the number of symbols of the SRS, repetition of the SRS, or frequency hopping of the SRS. For example, the configuration information may include a repetition factor. The repetition factor may be related to the number of symbols based on the repetition.

According to step S2010, the operation of the BS (100/200 in FIGS. 21 to 25) transmitting configuration information related to transmission of a sounding reference signal (SRS) to the UE (100/200 in FIGS. 21 to 25) may be implemented by the device of FIGS. 21 to 25. For example, referring to FIG. 22, the one or more processors 202 may control one or more transceivers 206 and/or one or more memories 204 to transmit configuration information related to a sounding reference signal (SRS) to the UE 100.

In S2020, the BS receives the SRS from the UE.

The SRS may be transmitted aperiodically, periodically, or semi-persistently. The SRS may be transmitted based on triggering of downlink control information or RRC configuration.

According to an embodiment, the SRS is repeatedly transmitted in a frequency domain based on the frequency hopping and at least one symbol based on the repetition.

The last transmission of the repeated transmissions may be performed based on a remainder value obtained by dividing the number of symbols of the SRS by the number of symbols based on the repetition.

In this case, the remainder value may be greater than or equal to 1. The remainder value may not be 0, and the number of symbols of the SRS may not be a multiple of the number of symbols based on the repetition. In this case, the following operations may be considered to prevent ambiguity in operation of the UE and to achieve coverage gain and sounding of the full frequency band.

The last transmission may be performed in a frequency domain based on the frequency hopping and a symbol based on the remainder value. This embodiment may be based on option 1 of proposal 2.

The last transmission may be performed in a frequency domain according to previous repeated transmission and a symbol based on the remainder value. This embodiment may be based on option 2 of proposal 2.

The last transmission may be dropped. This embodiment may be based on option 3 of proposal 2.

The last transmission may be performed differently based on whether the remainder value is smaller than a value corresponding to ½ of the repetition factor. This embodiment may be based on option 4 of proposal 2.

Based on that the residual value is greater than or equal to ½ of the repetition factor, the last transmission may be performed in a frequency domain based on the frequency hopping and a symbol based on the residual value.

Based on that the remainder value is less than ½ of the repetition factor, the last transmission may be performed in a frequency domain according to the previous repetition transmission and a symbol based on the remainder value.

Based on that the remainder value is less than ½ of the repetition factor, the last transmission may be dropped.

According to S2020, the operation of the BS (100/200 in FIGS. 21 to 25) receiving the SRS from the UE (100/200 in FIGS. 21 to 25) may be implemented by to the device of FIGS. 21 to 25. For example, referring to FIG. 22, one or more processors 202 may control one or more transceivers 206 and/or one or more memories 204 to receive the SRS from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 21 illustrates a communication system 1 applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 23 illustrates a signal process circuit for a transmission signal.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 24 illustrates another example of a wireless device applied to the present disclosure.

The wireless device may be implemented in various forms according to a use-case/service (refer to FIG. 21). Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 25 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method and device for transmitting and receiving a sounding reference signal in a wireless communication system according to an embodiment of the present specification are as follows.

According to an embodiment of the present disclosure, when repetition and frequency hopping are set together in connection with transmission of additional SRS, last transmission of repeated transmissions of SRS is transmitted based on a remainder value obtained by dividing the number of symbols by a repetition factor. Therefore, when the number of symbols of the SRS set in the UE is not a multiple of the repetition factor, ambiguity in operation of the UE may be prevented.

According to an embodiment of the present disclosure, based on the remainder value being greater than or equal to 1, the last transmission is performed in a frequency domain according to a previous repeated transmission and a symbol based on the remainder value or dropped. Therefore, even when the number of SRS symbols is not a multiple of the repetition factor value, channel estimation may be performed under a uniform condition for each SRS hopping band.

According to an embodiment of the present disclosure, if the remainder value is greater than or equal to 1, the last transmission performed differently based on whether the remainder value is smaller than a value corresponding to ½ of the repetition factor. Accordingly, channel estimation may be performed under uniform conditions for each SRS hopping band, and channel estimation and frequency selective band utilization/scheduling of the base station may be more optimized.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of transmitting a sounding reference signal (SRS) by a user equipment (UE) in a wireless communication system, the method comprising:
receiving configuration information related to transmission of the SRS; and
transmitting the SRS,
wherein the configuration information includes information on at least one of the number of symbols of the SRS, repetition of the SRS, or frequency hopping of the SRS, and
wherein the SRS is repeatedly transmitted in a frequency range based on the frequency hopping and at least one symbol based on the repetition,
wherein last transmission of the repeated transmissions is performed based on a remainder value obtained by dividing the number of symbols of the SRS by the number of symbols based on the repetition, and
wherein the configuration information includes a repetition factor, and the repetition factor is related to the number of symbols based on the repetition, wherein the remainder value is greater than or equal to 1, wherein the last transmission is dropped.

2. The method of claim 1, wherein the last transmission is performed in the frequency range based on the frequency hopping and a symbol based on the remainder value.

3. The method of claim 1, wherein the last transmission is performed in a frequency range in accordance with a previous repeated transmission and a symbol based on the remainder value.

4. The method of claim 1, wherein the last transmission is performed differently based on whether the remainder value is smaller than a value corresponding to ½ of the repetition factor.

5. The method of claim 4, wherein, based on that the remainder value is greater than or equal to ½ of the repetition factor, the last transmission is performed in the frequency range based on the frequency hopping and a symbol based on the remainder value.

6. The method of claim 5, wherein, based on that the remainder value is smaller than ½ of the repetition factor, the last transmission is performed in a frequency range in accordance with a previous repeated transmission and the symbol based on the remainder value.

7. The method of claim 5, wherein, based on that the remainder value is smaller than ½ of the repetition factor, the last transmission is dropped.

8. A user equipment (UE) for transmitting a sounding reference signal (SRS) in a wireless communication system, the UE comprising:
  one or more transceivers;
  one or more processors; and
  one or more memories configured to be operably connected to the one or more processors and store instructions for performing operations when transmission of the SRS is executed by the one or more processors,
  wherein the operations include:
  receiving configuration information related to transmission of the SRS; and
  transmitting the SRS,
  wherein the configuration information includes information on at least one of the number of symbols of the SRS, repetition of the SRS, or frequency hopping of the SRS, and
  wherein the SRS is repeatedly transmitted in a frequency range based on the frequency hopping and at least one symbol based on the repetition,
  wherein last transmission of the repeated transmissions is performed based on a remainder value obtained by dividing the number of symbols of the SRS by the number of symbols based on the repetition, and
  wherein the configuration information includes a repetition factor, and the repetition factor is related to the number of symbols based on the repetition, wherein the remainder value is greater than or equal to 1, wherein the last transmission is dropped.

9. A method of receiving a sounding reference signal (SRS) by a base station (BS) in a wireless communication system, the method comprising:
  transmitting configuration information related to transmission of the SRS; and
  receiving the SRS,
  wherein the configuration information includes information on at least one of the number of symbols of the SRS, repetition of the SRS, or frequency hopping of the SRS, and
  wherein the SRS is repeatedly transmitted in a frequency range based on the frequency hopping and at least one symbol based on the repetition,
  wherein last transmission of the repeated transmissions is performed based on a remainder value obtained by dividing the number of symbols of the SRS by the number of symbols based on the repetition,
  wherein the configuration information includes a repetition factor, and the repetition factor is related to the number of symbols based on the repetition, wherein the remainder value is greater than or equal to 1, wherein the last transmission is dropped.

* * * * *